(12) United States Patent
Grubel et al.

(10) Patent No.: US 9,245,150 B2
(45) Date of Patent: Jan. 26, 2016

(54) SEMANTICALLY DETERMINING A SECURITY CLASSIFICATION OF DATA

(71) Applicant: The Boeing Company, Chicago, IL (US)

(72) Inventors: Brian C. Grubel, Glen Burnie, MD (US); Ryan A. Hendrickson, Hanover, MD (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 14/270,905

(22) Filed: May 6, 2014

(65) Prior Publication Data

US 2015/0324609 A1 Nov. 12, 2015

(51) Int. Cl.
| | | |
|---|---|---|
| G06F 7/04 | (2006.01) | |
| G06F 17/30 | (2006.01) | |
| H04N 7/16 | (2011.01) | |
| G06F 21/64 | (2013.01) | |

(52) U.S. Cl.
CPC ...................................... *G06F 21/64* (2013.01)

(58) Field of Classification Search
CPC ............................... H04L 43/04; G06F 21/64
USPC ...................................................... 726/27, 26
See application file for complete search history.

(56) References Cited

U.S. PATENT DOCUMENTS

| | | | | |
|---|---|---|---|---|
| 6,161,130 | A * | 12/2000 | Horvitz et al. ................. | 709/206 |
| 2005/0182765 | A1 * | 8/2005 | Liddy ................................ | 707/5 |
| 2008/0127336 | A1 * | 5/2008 | Sun et al. ......................... | 726/22 |
| 2010/0010968 | A1 * | 1/2010 | Redlich et al. ..................... | 707/3 |
| 2014/0201838 | A1 * | 7/2014 | Varsanyi et al. ................. | 726/23 |

OTHER PUBLICATIONS

James B. D. Joshi; A Model for Secure Multimedia Document Database System in a Distributed Environment: IEEE; Year:2002; pp. 215-234.*
Apache Stanbol http://stanbol.apache.org, Received Jan. 16, 2014, Retrieved May 6, 2014.
Nuxeo Blogs, Introducing fise, the Open Source RESTful Semantic Engine http://www.nuxeo.com/blog/development/2010/08/introducing-fise-the-restful-semantic-engine/, Received Jan. 16, 2014, Retrieved May 6, 2014.
Apache OpenNLP Developer Documentation, http://opennlp.apache.org/documentation/1.5.3/manual/opennlp.html, Received Jan. 16, 2014, Retrieved May 6, 2014.
Wikipedia, Latent semantic analysis, http://en.wikipedia.org/wiki/Latent_semantic_analysis, Received Jan. 16, 2014, Retrieved May 6, 2014.
Wikipedia, Bell-LaPadula Model, http://en.wikipedia.org/w/index.php?oldid=596020645, Retrieved Mar. 7, 2014.

(Continued)

*Primary Examiner* — Monjour Rahim
(74) *Attorney, Agent, or Firm* — Kunzler Law Group, PC

(57) ABSTRACT

Disclosed herein is a method for determining a security classification for data that includes generating a classification signature for data based on a semantic interpretation of the data. The classification signature is associated with a security classification for the data. The method also includes comparing the generated classification signature to a predetermined classification signature associated with the security classification. Further, the method includes verifying the generated classification signature matches the predetermined classification signature.

23 Claims, 7 Drawing Sheets

(56) References Cited

OTHER PUBLICATIONS

Wikipedia, Compartmentalization (Information Security), http://en.wikipedia.org/w/index.php?oldid=588451107, Retrieved Mar. 7, 2014.

Wikipedia, Sensitive Compartmented Information, http://en.wikipedia.org/w/index.php?oldid=592806364, Retrieved Mar. 7, 2014.

* cited by examiner

SEMANTICALLY DETERMINING A SECURITY CLASSIFICATION OF DATA

FIELD

This disclosure relates to secure information systems, and more particularly to determining a security classification for data based on a semantic analysis of the data.

BACKGROUND

Information systems with multi-level security architecture models can leverage security compartments to further segregate and protect sensitive information. A user or system may have access to sensitive data on one or more compartments based on a "need to know" basis. When a user no longer needs to know the sensitive data in a security compartment, the user's access to the data should be removed; however, some users may mistakenly retain their access privileges and accumulate access to various security compartments. Users with multiple access privileges to multiple security compartments may be able to aggregate information of a compartment to which they do not have access. Moreover, users may store data in security compartments that do not match the security level of the data. Thus, misclassified data may be stored in a compartment that is accessible to a user, and/or sent to a user, who does not have clearance to view the data. Moreover, misclassified data may transit various information systems and networks that may not comply with the data's security classification.

SUMMARY

The subject matter of the present application has been developed in response to the present state of the art, and in particular, in response to the problems and needs of computing environments that have not yet been fully solved by currently available systems. For example, although conventional computing environments may manually tag data with security classifications and/or search data for particular words associated with a security classification, they do not semantically analyze data to determine the security classification of the data. In general, the subject matter of the present application has been developed to provide a computing environment that overcomes at least some of the above-discussed shortcomings of the prior art.

According to one embodiment, a method for determining a security classification for data includes generating, by use of a processor, a classification signature for data based on a semantic interpretation of the data. The classification signature is associated with a security classification for the data. The method also includes comparing the generated classification signature to a predetermined classification signature associated with the security classification. Further, the method includes verifying the generated classification signature matches the predetermined classification signature.

In some implementations, the semantic interpretation of the data is performed using a semantic engine. The semantic engine can determine the interpretation of the data based on one or more of the following: a classification guide, a classification signature of existing data, a word list, and user input. The method further includes updating the semantic engine based on user input associated with the data.

In another implementation, the method includes determining a match value in response to comparing the generated classification signature and the predetermined classification signature. Verifying the generated classification signature matches the predetermined classification signature, includes determining the match value is within a predetermined threshold. In some implementations, the data is associated with a security compartment comprising one or more security levels. The security classification defines an access level for the security compartment.

In one implementation, the method includes comparing the generated classification signature to a security classification assigned to the data by a user. The user is notified in response to the generated classification signature not matching the assigned security classification. In some implementations of the method, the predetermined classification signature is associated with a security classification for a recipient of the data. The data can be sent to the recipient in response to the generated classification signature matching the predetermined classification signature.

In another implementation, the method additionally includes returning the data to a sender of the data in response to the generated classification signature for the data not matching the predetermined classification signature of the recipient. The data that is returned to the sender includes suggestions for conforming the data to the security classification of the recipient. In some implementations, the predetermined classification signature is one of a plurality of predetermined classification signatures associated with a data repository. Additionally, the predetermined classification signature is associated with one of a plurality of security compartments of the data repository.

In a further implementation, the data comprises data within a security compartment of the data repository. The generated classification signature for the data may be compared to the predetermined classification signature for the security compartment to verify the security classification of the data corresponds to a security classification of the security compartment.

In one implementation, the method includes monitoring data modifications and generating a classification signature for the data in real-time in response to the data modifications. One or more classification recommendations for the data are presented to a user in response to the generated classification signature for the data in real-time not matching the predetermined classification signature. A classification recommendation may include a data modification that conforms the data to the security classification of the predetermined classification signature.

According to some implementations, the method further includes sending a notification in response to the generated classification signature not matching the predetermined classification signature. The method may further include managing one or more predetermined classification signatures. The one or more predetermined classification signatures may be organized into a signature file that is stored on a classification device of a computing environment.

According to another embodiment, an apparatus for determining overlapping security classifications includes a processor and memory. The memory stores machine readable code executable by the processor. The machine readable code includes a signature module that generates a first classification signature for a first data based on a semantic interpretation of the first data and a second classification signature for a second data based on a semantic interpretation of the second data. The first classification signature may be associated with a first security classification and the second classification signature may be associated with a second security classification.

In another implementation, the apparatus includes a match module that compares the first classification signature with the second classification signature. The apparatus, in a further implementation, the apparatus includes a validation module that determines an overlap score between the first classification signature and the second classification signature. The overlap score determines the degree with which the first security classification overlaps with the second security classification.

In one implementation of the apparatus, the match module further compares a third classification signature for a third data with both the first and second classification signatures, and the validation module further determines an overlap score between the first, second, and third classification signatures. In another implementation, the apparatus includes a recommendation module that generates one or more classification recommendations for the data. The classification recommendations may include data modifications that reduce an amount of overlap between the first security classification and the second security classification. The recommendation module, in a further implementation, generates one or more new security classifications for the data in response to the overlap score. Additionally, the recommendation module further generates one or more user access recommendations in response to the overlap score, which may comprise a modification to a security access level associated with a user.

According to some implementations of the apparatus, the validation module ranks sets of compared classification signatures in order of overlap score and presents the rankings to a user. Additionally, in certain implementations of the apparatus, the first and second data comprise one or more of a plurality of classification guides and data associated with a security compartment. Some implementations of the apparatus include a notification module that sends a notification in response to the overlap score being above a predetermined threshold.

According to yet another embodiment, a program product for determining a security classification for data includes a computer readable storage medium that stores code executable by a processor to perform actions. The actions, in some implementations, include generating a classification signature for data based on a semantic interpretation of the data. In another implementation, the classification signature is associated with a security classification for the data.

In a further implementation, the actions include comparing the generated classification signature to a predetermined classification signature associated with the security classification. In yet another implementation, the actions include verifying the generated classification signature matches the predetermined classification signature.

In certain implementations of the program product, the semantic interpretation of the data is generated using a semantic engine, which determines the interpretation of the data based on one or more of a classification guide, a classification signature of different data, a word list, and user input. In some implementations, the actions further include maintaining a log file comprising metadata associated with the generation of the semantic interpretation of the data.

In yet another implementation, the actions include monitoring data modifications and generating a classification signature for the data in real-time in response to the data modifications. One or more classification recommendations for the data may be presented to a user in response to the generated classification signature for the data in real-time not matching the predetermined classification signature. In some implementations, a classification recommendation includes a data modification to conform the data to the security classification for the predetermined classification signature.

The described features, structures, advantages, and/or characteristics of the subject matter of the present disclosure may be combined in any suitable manner in one or more embodiments and/or implementations. In the following description, numerous specific details are provided to impart a thorough understanding of embodiments of the subject matter of the present disclosure. One skilled in the relevant art will recognize that the subject matter of the present disclosure may be practiced without one or more of the specific features, details, components, materials, and/or methods of a particular embodiment or implementation. In other instances, additional features and advantages may be recognized in certain embodiments and/or implementations that may not be present in all embodiments or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific embodiments that are illustrated in the appended drawings. Understanding that these drawings depict only typical embodiments of the subject matter and are not therefore to be considered to be limiting of its scope, the subject matter will be described and explained with additional specificity and detail through the use of the drawings, in which.

DETAILED DESCRIPTION

Reference throughout this specification to "one embodiment," "an embodiment," or similar language means that a particular feature, structure, or characteristic described in connection with the embodiment is included in at least one embodiment of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments.

Figure 1:
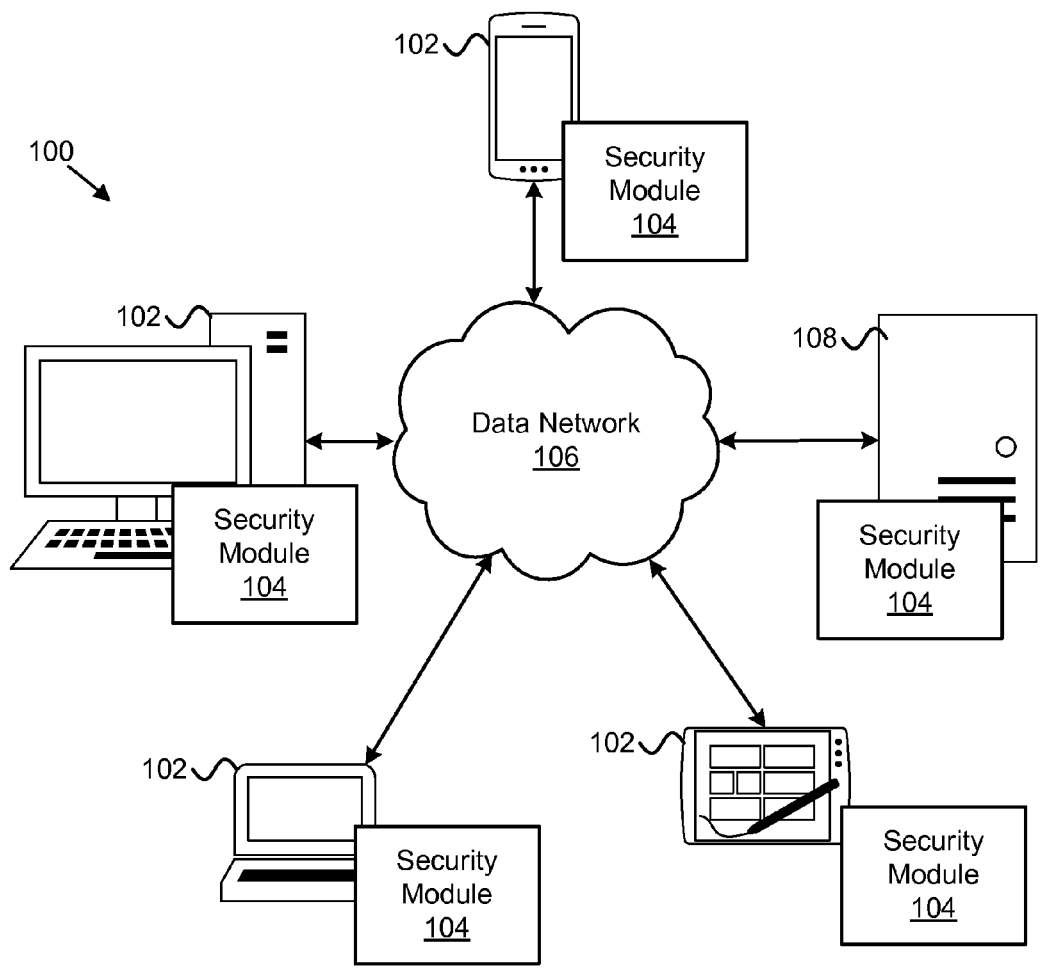
FIG. 1 is a schematic block diagram illustrating one embodiment of a system for determining a security classification for data.

FIG. 1 illustrates one embodiment of a system 100 for determining a security classification for data. The system 100, in certain embodiments, includes information handling devices 102, security modules 104, digital communication data networks 106, and servers 108, which are described in more detail below.

The information handling devices 102, in one embodiment, include mobile devices, such as smart phones, tablet computers, laptops, optical head mounted displays, smart watches, digital cameras, and/or the like. In another embodiment, the information handling devices 102 include desktop computers, servers, and/or the like. In some embodiments, the information handling devices 102 include operating systems, such as various versions of mobile and desktop operating systems provided by Microsoft®, Apple®, Linux, Android, and/or the like. For example, the information handling devices 102 may include a tablet running a version of Apple® iOS, a smart phone running a version of Windows® Mobile, and a laptop running a distribution of Linux. In certain embodiments, the information handling devices 102 are communicatively coupled to one another through the data network 106. The information handling devices 102 may also include data capture devices, such as digital cameras, microphones, sensors (e.g., proximity sensors, touch sensors, or the like), and/or the like.

In one embodiment, the system 100 includes servers 108. The servers 108, in some embodiments, include main frame computers, desktop computers, laptop computers, cloud servers, smart phones, tablet computers, and/or the like. The servers 108 may include computer readable storage media, such as hard disk drives, optical drives, non-volatile memory, random access memory ("RAM"), or the like. In some embodiments, the servers 108 are configured to store data in one or more data storage areas associated with the computer readable storage media, such as data repositories, databases, data partitions, and/or the like. In certain embodiments, the servers 108 comprise one or more virtual machines. In one embodiment, the information handling devices 102 are communicatively coupled to the servers 108 through the data network 106. In another embodiment, the information handling devices 102 access data stored on the servers 108 through the data network 106.

The system 100, in one embodiment, includes a data network 106. The data network 106, in certain embodiments, is a digital communication data network 106 that transmits digital communications between the information handling devices 102 and/or the servers 108. The digital communication data network 106 may include a wireless network, such as a wireless telephone network, a local wireless network, such as a Wi-Fi network, a Bluetooth® network, and the like. The digital communication network 106 may include a wide area network ("WAN"), a storage area network ("SAN"), a local area network ("LAN"), an optical fiber network, the internet, or other digital communication network known in the art. The digital communication network data 106 may include two or more networks. The digital communication network 106 may include one or more servers, routers, switches, and/or other networking equipment. The digital communication data network 106 may also include computer readable storage media, such as a hard disk drive, an optical drive, non-volatile memory, random access memory ("RAM"), or the like.

In one embodiment, the information handling devices 102 and/or the servers 108 are configured to execute various services and/or programs, such as productivity applications, Internet applications, email clients, and/or the like. In some embodiments, the information handling devices 102 and/or servers 108 are configured to send data, store data, receive data, and/or like. The data, in one embodiment, includes machine readable images, such as a computer file that contains the contents and structure of a disk volume, or an entire storage device. Machine readable images may contain data from devices such as hard drives, tape drives, floppy drives, optical discs, USB flash drives, and/or the like. In certain embodiments, the data includes text data, binary data, protocol buffer data, archived files, images (e.g., .jpeg, .png, .gif, or the like), videos, audio files, or the like. The data may also include metadata, such as EXIF data, or the like. In another embodiment, the data includes metadata such as geographic data (e.g., global positioning system ("GPS") data, including latitude/longitude coordinates, or the like), a date stamp, a size, a rating, an author, or the like, which may be used to determine a security classification for the data and/or a classification signature for the data, as described below.

In certain embodiments, the data is associated with a security classification. As used herein, a security classification describes a data security level in terms of confidentiality, integrity, availability, and/or the like. In certain embodiments, a security classification is associated with a business, an organization, a government, or the like. For example, the data may be assigned a security classification, such as "Top Secret," "Secret," "Confidential," "Unclassified," or the like. Other examples may include, "Priority Class A," "Priority Class B," "Protection Level 1," "Protection Level 2," "High," "Medium," "Low," "Official," "Restricted," or the like. Alternatively, different levels of proprietary data may be used in place of a security classification, such as "Competition Sensitive," or the like.

The security classification may also refer to a data security level for a combination of a security compartment and a security level. In order to access data having a particular security classification, such as "Top Secret," a user or device has the same, or higher, security classification as the data. For example, a user with a "Secret" security classification may access data having a "Secret," or lower, security classification, but not data having a higher security classification, such as "Top Secret." In some embodiments, the security classification is based on a security access control model, such as the Bell-LaPadula Model, the Biba Integrity Model, or the like.

In one embodiment, the data is organized into one or more security compartments. As used herein, a security compartment limits access to data within the security compartment to persons who, and/or systems/sub-systems that, are authorized to access the data, such as on a need to know basis, in order to perform certain tasks. In some embodiments, a security compartment comprises a data repository, such as a logical or physical partition on a hard drive, on an information handling device 102 or a server 108. In one embodiment, the security compartment is part of a computing environment that includes one or more computing devices connected via the data network 106. The computing environment may include a secure computing environment, an unsecure computing environment, a partially secure computing environment, some combination of connected computing environments across networks, or the like. In another embodiment, a security compartment comprises a sub-system of a computing environment such that the security compartment includes a firewall, router, servers, or the like, separate and accessible through the computing environment, i.e., through the data network 106.

In one embodiment, a security compartment includes one or more security levels. For example, security compartment A may only contain "Top Secret" data and security compartment B may contain "Top Secret," "Secret," and "Confidential" data. A security compartment, in certain embodiments, ensures that data is accessed by a user or system authorized to access data within the compartment and also that the security classification of the user or system matches the security classification of the data being accessed. In some embodiments, a security compartment may be referred to as a security channel, such as channel ALPHA, channel BETA, or the like. Each channel may also include one or more security levels. For example, data may be classified at classification level "Top Secret" within security compartment "ALPHA," or "Secret" within security compartment "BETA," which may be represented using the shorthand TS//ALPHA and S//BETA, respectively.

A user or system may have a general security level clearance, such as "Top Secret," to access generally classified information that may not belong to a security compartment, but not have clearance to data within a particular compartment, such as "ALPHA" or "BETA." In certain embodiments, a user or system may be cleared to access specific security compartments, and their assigned security levels may determine the level of classified data within the security compartment that may be accessed. For example, a user or system that is cleared to access the "ALPHA" security compartment may only have access to "Secret" data within the "ALPHA" compartment. Thus, the user or system would not be allowed to access "Top Secret" data (e.g., TS//ALPHA), but could access "Secret" and "Confidential" data (e.g., S//ALPHA and C//ALPHA). Further, the user or system would not be allowed to access "Secret" data in the "BETA" compartment. In certain embodiments, a user or system may be assigned multiple clearance levels for multiple security compartments and/or multiple security levels within a compartment.

In one embodiment, a data's security clearance specifies who the data is releasable to, which may include where the data may sent, where the data may be stored, who and/or what may access the data, and/or the like. In some embodiments, the security clearance includes a tag, indicator, mark, or the like, that specifies individuals, organizations, locations, services, networks, or the like, that the data may be releasable to. In one embodiment, the management module 312, described below with reference to FIG. 3, determines the releasable status of the data. For example, data may be assigned a security clearance such as "TS//ALPHA//REL to MD/PA/CA," indicating the data may only be accessed by a user, system, organization, or the like, who (1) has a Top Secret security clearance, (2) has access to ALPHA data, and (3) is associated with a specific organization from Maryland (MD), Pennsylvania (PA), or California (CA). Thus, someone who has a TS//ALPHA clearance, but is associated with a New Jersey (NJ) organization, may not have access to the data because the data is not releasable to the New Jersey organization. In certain embodiments, the security clearance indicates a specific person, a group of people, a category of people, or the like, that the data may be releasable to, e.g., John Doe, U.S. Citizens, etc.

In some embodiments, the system 100 includes a security module 104. The security module 104, in one embodiment, generates a classification signature for data based on a semantic interpretation of the data, compares the classification signature to a predetermined classification signature, and verifies the generated classification signature matches the predetermined classification signature. In certain embodiments, the security module 104 includes a plurality of modules that perform the operations of the security module 104. The security module 104, with its accompanying modules, is described in more detail with reference to FIGS. 2 and 3.

Figure 2:
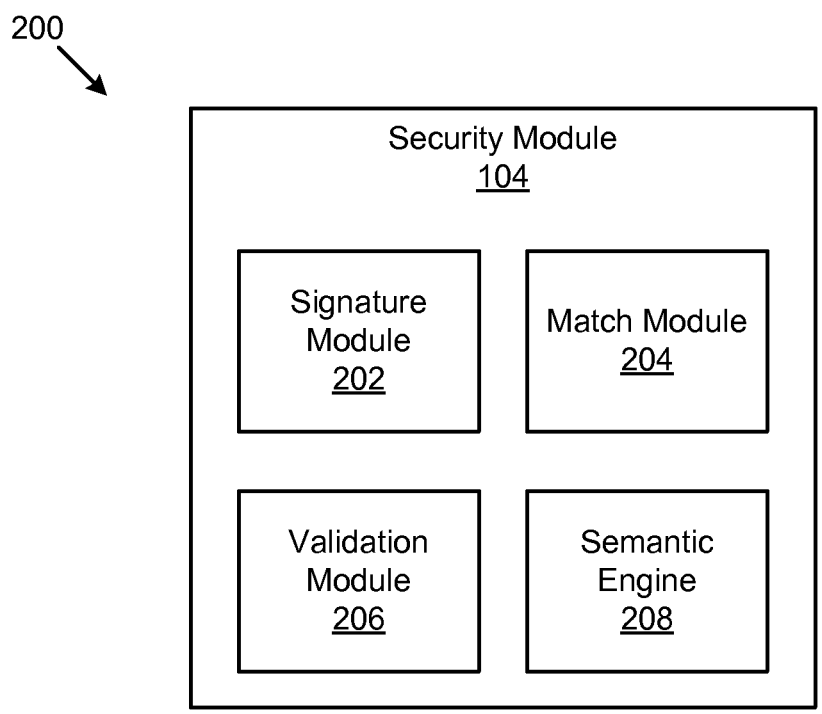
FIG. 2 is a schematic block diagram illustrating one embodiment of a module for determining a security classification for data.

FIG. 2 illustrates one embodiment of a module 200 for determining a security classification for data. In one embodiment, the module 200 includes an implementation of a security module 104. In certain embodiments, the security module 104 includes a signature module 202, a match module 204, a validation module 206, and a semantic engine 208, which are described in more detail below.

In one embodiment, the signature module 202 generates, by use of a processor, a classification signature for data based on a semantic interpretation of the data. In some embodiments, the classification signature is associated with a security classification. As used herein, a classification signature may comprise a partially-structured semantic representation of meaning of a security classification definition. The data, in certain embodiments, includes data stored on an information handling device 102 or a server 108, data being transmitted within a computing environment over the data network 106, classification guides, identifying user information, and/or the like. For example, the signature module 202 may generate a classification signature for an email by determining a semantic interpretation of the body of the email by searching for words or context, in order to determine a security classification for the email.

In another embodiment, the signature module 202 generates a classification signature for each paragraph, section, part, clause, or the like of a document. For example, the signature module 202 may generate a classification signature for each paragraph of a three-paragraph email, for images within the email, or the like. In some embodiments, the security classification of a document is based on the highest security classification of a section of the document. For example, if a document contains three paragraphs, each with a security classification of "Top Secret," "Secret," and "Confidential," respectively, the security classification of the document may be the highest security classification of the paragraphs, e.g., "Top Secret."

In one embodiment, the signature module 202 generates a classification signature for the data using a semantic analysis process, such as a semantic engine 208, or the like. A semantic engine 208, as used herein, may determine, categorize, tune/adjust, configure, or the like, a semantic interpretation of the data by understanding the intent and contextual meaning of terms as they appear in the data. The semantic engine 208, in some embodiments, may also consider other points to generate the classification signature, such as variation of terms, synonyms, concept matching, natural language processing, and/or the like. Examples of semantic engines 208 may include Apache Stanbol, Apache OpenNLP, Fise, and/or the like. In other embodiments, the semantic engine 208 may be capable of producing a Latent Semantic Index ("LSI"), a Latent Dirichlet allocation ("LDA"), or the like. Additionally, the semantic engine 208 may be updated from valid output from itself, causing the semantic analysis to be self-learning. In certain embodiments, the semantic engine 208 comprises a semantic classification engine ("SCE") that creates classification signatures for a given security compartment based on input information, such as data stored within the security compartment, classification definitions, classification guides, user classifications, and/or the like.

Figure 4:
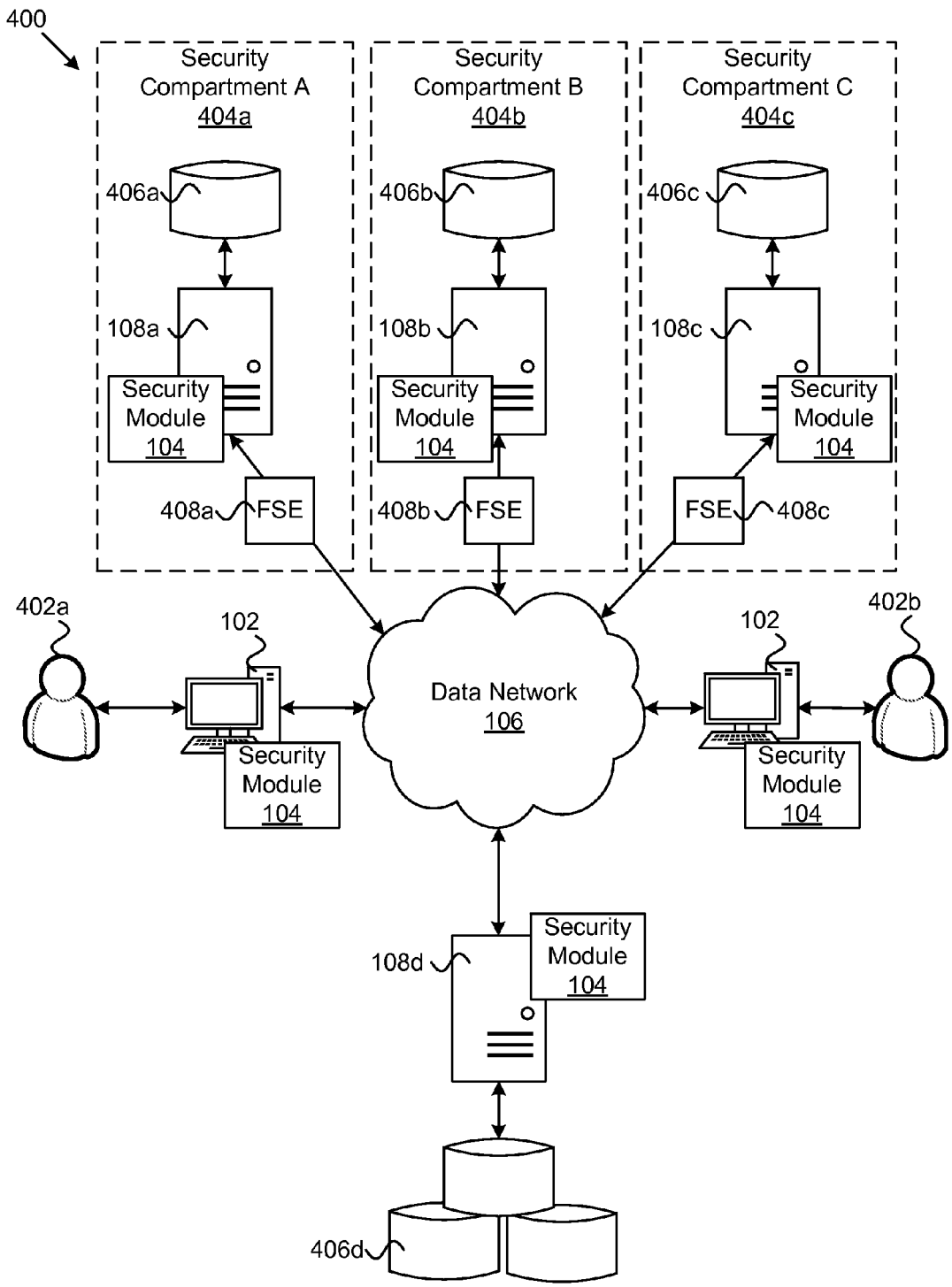
FIG. 4 is a schematic block diagram illustrating one embodiment of a computing environment.

In some embodiments, a semantic engine 208 is located on an information handling device 102 and/or a server 108 and performs semantic interpretation analysis for every security compartment within a computing environment. In another embodiment, each security compartment, i.e., as depicted in FIG. 4, the information sub-system defining a domain of a particular security compartment, includes a semantic engine 208. In some embodiments, a security compartment includes an associated forward semantic element ("FSE") that maintains a file of classification signatures maintained by the SCE. The FSE may receive data sent from and/or to the security compartment and if the FSE does not recognize the data, the FSE may forward the data to the SCE for semantic analysis. In certain embodiments, a computing environment includes security compartments in a nested architecture where there exists a trusted authority for a group of security compartments. In certain embodiments the security compartments are organized in a hierarchy. In such an embodiment, the FSE may request information from security compartments within the hierarchy having the highest security classification necessary in order to process the data. The SCE or the FSE may then route the data to the appropriate security compartment administrator or classification authority associated with a security compartment. In some embodiments, the FSE is a process installed on a router, server 108, switch, or the like, associated with a security compartment.

In certain embodiments, the signature module 202 generates a classification signature based on one or more classification guides/manuals associated with the data. In some embodiments, a semantic engine 208 determines a semantic interpretation of the data based on the one or more classification guides/manuals. A classification guide, in some embodiments, defines the boundaries of a security classification. For example, the classification guide for the "Top Secret" security classification may explain the types and/or contents of data that comprise "Top Secret" data, where to store the data, who may access the data, whether and how to encrypt/decrypt the data, and/or the like. Each security classification may have an associated classification guide that defines the characteristics of the security classification. The signature module 202, based on the classification guide, may generate a classification signature by performing a semantic analysis on the classification guide. In certain embodiments, the signature module 202 associates the generated classification signature with the security classification for the classification guide.

In another embodiment, the signature module 202 generates a classification signature based on existing data within a data repository for a security compartment associated with a security classification. In some embodiments, a semantic engine 208 determines a semantic interpretation of the data based on the data. For example, the signature module 202 may analyze data categories, tags associated with data, related data, terms within a document, contextual information, and/or the like. The signature module 202, based on the semantic analysis of the data within the security compartment, may determine a classification signature for the security classification associated with the data and the security compartment. For example, if the analyzed data is assigned a "Top Secret" security classification within the security compartment, the signature module 202 may associate the generated classification signature with the "Top Secret" security classification for the security compartment.

In a further embodiment, the signature module 202 generates a classification signature based on user input and/or system input associated with the data. In some embodiments, a semantic engine 208 determines a semantic interpretation of the data based on the user input. In some embodiments, the signature module 202 analyzes user input such as data labels, data tags, word lists, rule sets/files, filters, and/or the like. The signature module 202, based on the semantic analysis of the user input, may determine a classification signature for the security classification associated with the data and the security compartment. For example, if the user assigns a "Top Secret" label to the data, the signature module 202 may associate the semantic analysis of the data, i.e., the generated classification signature, with the "Top Secret" security classification for the security compartment where the data is located. In one embodiment, the signature module 202 is also configured to be manually trained by a user. For example, a user may specify certain criteria, such as word lists, semantic processes, or the like, that the signature module 202 uses to generate a classification signature.

In certain embodiments, the signature module 202 maintains a cache of classification signatures, which the signature module 202 accesses instead of generating new classification signatures. In such an embodiment, the signature module 202 retrieves a classification signature from the cache and determines whether the classification signature is valid. If not, the signature module 202 generates a new classification signature and may store the new classification signature in the cache.

In some embodiments, the signature module 202 re-analyzes data and re-generates classification signatures in response to an event. In one embodiment, the signature module 202 generates a new classification signature in response to existing data being modified. In another embodiment, the signature module 202 generates a new classification signature for data based on a predetermined schedule, interval, time period, or the like. For example, the signature module 202 may re-analyze data every hour and compare a new classification signature to an old classification signature to determine whether the classification signatures are different. If the classification signatures are different, the old classification signature may be discarded. In a further embodiment, the signature module 202 generates new classification signatures in response to modifications in the semantic engine 208, i.e., modifications in the semantic analysis process.

In one embodiment, the signature module 202 is configurable such that a user or system may configure how classification signatures are generated. In certain embodiments, the signature module 202, in order to provide feedback associated with classification signature generation, maintains a history of classification signatures for data and presents various revisions of the classification signatures. In this manner, a user may visualize how a classification signature for data has changed over time in order to better configure the signature module 202. In another embodiment, the signature module 202 turns on and off certain input channels based on user or system input. For example, the signature module 202 may generate a classification signature using existing data and user input, but ignore word lists, in response to the user specifying that word lists should not be used to generate classification signatures. In a further embodiment, the signature module 202 tests generated classification signatures on test data to ensure the classification signatures are appropriate for certain data. In such an embodiment, the signature module 202 presents the results of the tests to a user, who may use the data to reconfigure the signature module 202. In some embodiments, the signature module 202 receives updates from other signatures modules 202 that are deployed within a computing environment. For example, a signature module 202 may broadcast new signatures, variations on existing signatures, or the like. A signature module 202 may also inquire other signature modules 202 about data that do not match the classification signatures of the inquiring signature module 202.

In one embodiment, a match module 204 compares a generated classification signature for the data to a predetermined classification signature associated with a security classification. As described above, the signature module 202 generates a classification signature based on a semantic interpretation of the data associated with a security compartment that has a security classification. In some embodiments, the signature module 202 generates one or more predetermined classification signatures, which each serve as a baseline classification signature for the security compartment and the security classification associated with the security compartment. The predetermined classification signatures define the security classification for the security compartment such that any data that is associated with the security compartment has a classification signature that matches the predetermined classification signature (e.g., matches within a predetermined threshold).

The match module 204, in a further embodiment, compares the classification signature of the data generated by the signature module 202 to the predetermined classification signature to determine whether the data conforms to the security classification of the security compartment. For example, the match module 204 may compare a classification signature of an email sent to security compartment A to a predetermined classification signature for security compartment A to determine whether the contents of the email conform to the security classification requirements of security compartment A.

In some embodiments, the match module 204 determines a match value in response to comparing the generated classification signature for the data to the predetermined classification signature. The match value, in one embodiment, includes an analytic value such as a correlation, a percentage, a probability, a standard deviation, a statistical significance value, and/or the like.

In one embodiment, a validation module 206 verifies the generated classification signature for the data matches the predetermined classification signature. In some embodiments, the validation module 206 verifies the generated classification signature for the data matches the predetermined classification signature by determining the match value generated by the match module 204 is within a predetermined threshold. The validation module 206, in one embodiment, establishes a threshold value for the match value in order to verify that two or more classification signatures match. For example, the threshold value for a match value comprising a correlation may be 0.75; thus, a match value having a correlation below 0.75 would not be considered a strong match. Similarly, a threshold value of 50% would mean that a match value having a percentage match of less than 50% would not be considered a strong match. Alternatively, in another embodiment, the validation module 206 rank-orders the comparisons based on the match value and presents an ordered list to a user, such as a security administrator. In another embodiment, the validation module 206 presents identified words, phrases, terms, pictures, videos, audio files, binary data, metadata, or the like, that impacted the match value.

In one embodiment, the validation module 206 comprises a validation engine that may be configured with one or more plugins, add-ons, or the like, to verify the generated classification signature for the data matches the predetermined classification signature. In certain embodiments, the validation module 206 provides an interface to the validation engine to allow a user, system, device, or the like, to access and configure the validation engine. The validation module 206 may also dynamically select which plugins, add-ons, or the like, to use to verify the generated classification signature for the data matches the predetermined classification signature based on the data.

In another embodiment, the validation module 206 generates an overlap score for two or more classification signatures. In one embodiment, the overlap score determines the degree with which compared classification signatures overlap. The overlap score, as used herein, describes the degree to which the boundary for a security classification, e.g., "Top Secret," overlaps with the boundary of a different security classification, e.g., "Secret," for a security compartment. Alternatively, the overlap score may describe the degree to which the boundary of a security compartment overlaps with the boundary of a different security compartment. The classification signatures may comprise a semantic analysis of classification guides, data within a security level of a security compartment (e.g., data at a "Top Secret" level within security compartment A), or the like.

For example, the signature module 202 may generate classification signatures for classification guides defining two different security classifications, such as "Top Secret" and "Secret." The match module 204 may compare the signatures and the validation module 206 may generate an overlap score to determine to what degree the classification signatures overlap, based on a semantic interpretation of the classification guides. The overlap score, in one embodiment, comprises a correlation, a percentage, or the like. An overlap score that is greater than zero, or another predetermined threshold value, for example, may indicate that there is some level of overlap between the classification signatures, and, therefore, between the definitions of the security classifications. In some embodiments, if a user or system has access to two different security compartments that overlap with a third security compartment that the user or system does not have access to, the user or system may still be able to discover sensitive data within the third security compartment based on the overlapping portions of the two security compartments.

In a further embodiment, the match module 204 compares a third classification signature generated by the signature module 202 for a third classification guide with both the first and second classification signatures. The validation module 206 further determines an overlap score between the first, second, and third classification signatures to determine the amount of overlap between the first, second, and third classification guides. In certain embodiments, the match module 204 compares classification signatures for a plurality of classification guides, and the validation module 206 determines overlap scores for every possible permutation, or a subset of permutations, of comparisons of classification signatures for the plurality of classification guides.

In some embodiments, the validation module 206 presents a list of various combinations of classification signatures ranked by their overlap scores. In another embodiment, a recommendation module 310, described below, presents one or more recommendations for modifying classification guides, changing user/system access levels, moving data, or the like, based on a semantic analysis of the data in order to establish mutual exclusivity between different security classifications. The recommendation module 310 may also suggest one or more new security classifications, including security compartments and/or security levels.

Figure 3:
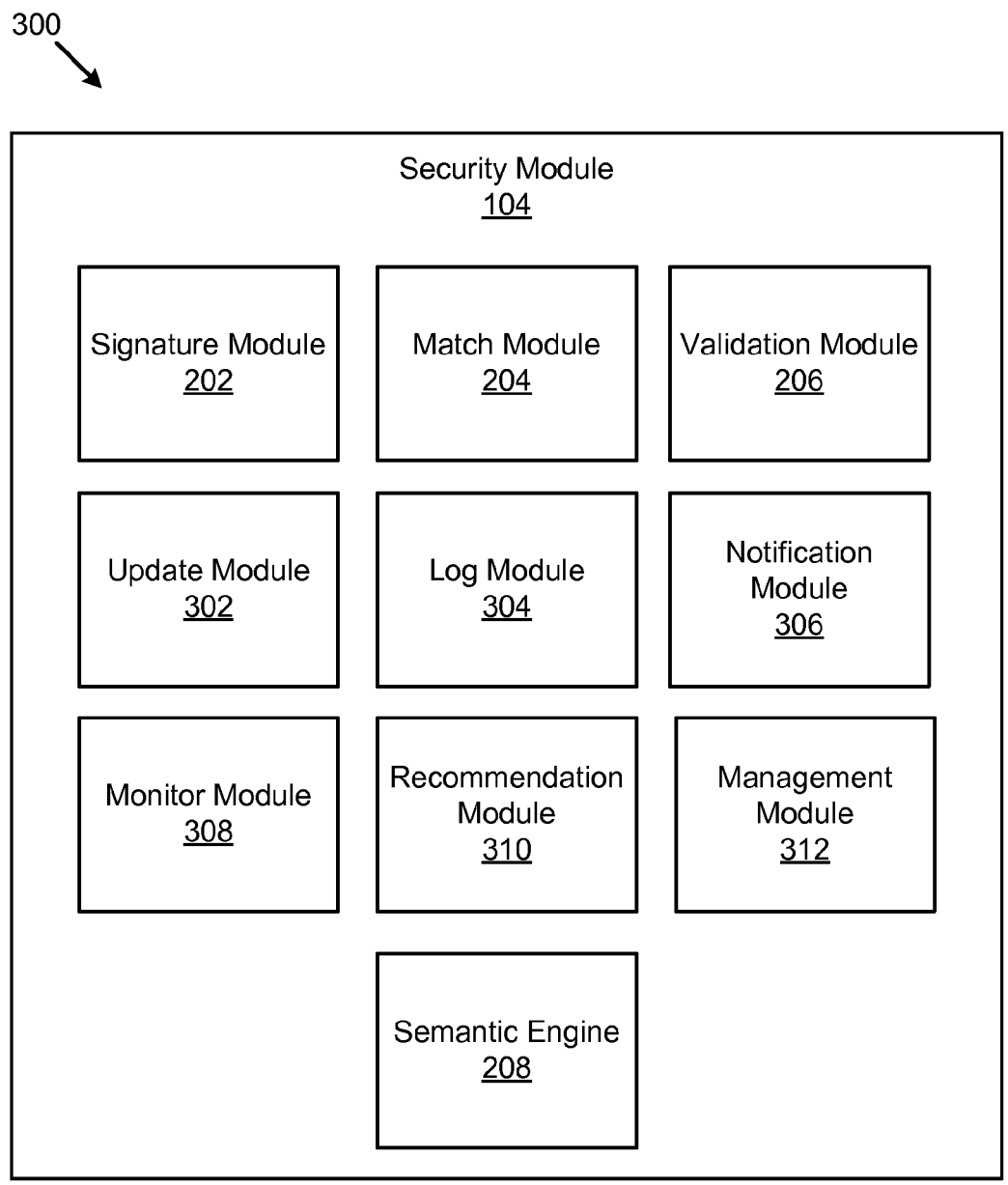
FIG. 3 is a schematic block diagram illustrating one embodiment of another module for determining a security classification for data.

FIG. 3 depicts another embodiment of a module 300 for determining a security classification for data. In some embodiments, the module 300 includes an implementation of a security module 104. The security module 104 includes a signature module 202, a match module 204, a validation module 206, and a semantic engine 208, which may be substantially similar to the signature module 202, the match module 204, the validation module 206, and the semantic engine 208 described above with reference to the module 200 of FIG. 2. The security module 104 of the module 300, in one embodiment, also includes an update module 302, a log module 304, a notification module 306, a monitor module 308, a recommendation module 310, and a management module 312, which are described in more detail below.

In one embodiment, the update module 302 trains and/or modifies the semantic analysis process (e.g., the semantic engine 208) based on input received from a user or system. Initially, the semantic engine 208 may be trained based on training data in order to enhance the accuracy of the semantic analysis. The training data may include classification guides, classified data, word lists, rule sets, filters, or the like, associated with a particular security compartment and security classification. Over time, the update module 302 may continue to train the semantic engine 208 in response to new training data, user input, results from previous semantic analyses, and/or the like.

In certain embodiments, the update module 302 receives input from a user or system regarding the security classification for the data. For example, a document may be flagged as being in an incorrect security compartment according to a comparison of a generated classification signature for the data and a predetermined classification signature for the security compartment. The user, such as a classification administrator, may receive a notification regarding the flagged document and may manually specify a security classification label for the document. In response to the user's input, the update module 302 updates the semantic analysis process by incorporating the user's input, together with the meaning of the data in the document, to future semantic analyses. In some embodiments, after the semantic analysis process is sufficiently trained (e.g., according to a predetermined training score or threshold), the update module 302 may not allow a user or system to override classification recommendations, suggestions, or the like.

In another embodiment, the update module 302 receives input from a system, sub-system, module, device, or the like, that broadcasts or pushes updates to the computing environment via the data network 106. In some embodiments, the update module 302 updates the semantic analysis process in response to a predetermined number of other systems, sub-systems, modules, devices, or the like recommending or suggesting the same update. For example, the update module 302 may not update the semantic analysis process until a majority of the other modules within the computing environment recommend or suggest a particular update. Thereafter, each update module 302 of the computing environment may accept the update and apply it to the semantic analysis process.

In one embodiment, the log module 304 maintains a log file comprising metadata associated with the generation of the semantic interpretation of the data by the semantic engine 208. In some embodiments, the log module 304 generates a history of semantic analyses performed on the data. In certain embodiments, the log module 304 tracks how the semantic engine 208 interprets the meaning of terms and/or words included in the data in view of a particular security classification. For example, the log module 304 may track how the semantic analysis was performed on data assigned a "Top Secret" security classification, such as by tracking word associations, synonyms, word patterns, contextual information, and/or the like. In certain embodiments, the log module 304 tracks the basis of the semantic analysis, such as a classification guide for the "Top Secret" security classification, other existing "Top Secret" data, user input, and/or the like.

The update module 302, in certain embodiments, uses the data tracked by the log module 304 to train and/or modify the semantic analysis process. For example, the update module 302 may determine connections between the analysis of different terms, contextual information for words or terms, synonyms, and/or the like, and may modify how the semantic engine 208 determines meaning and contextual information for a particular security classification. In another embodiment, the log module 304 mines data from one or more logs in response to user input. For example, the user may search for data within log files by keyword, user, date, classification label, data type, and/or the like.

In one embodiment, the notification module 306 sends notifications to a user, such as a classification officer, or a system, in response to events, modifications, and/or the like associated with the data of a security compartment. For example, the notification module 306 may send a notification in response to an overlap score between two or more classification signatures being above a predetermined threshold. In certain embodiments, the notification module 306 sends notifications regarding the status of various data, such as whether the data matches a security classification of a security compartment, whether the data has been modified and needs to be re-analyzed (i.e., generating a new classification signature for the data), whether a security classification for the data has been changed, and/or the like. In certain embodiments, the notification module 306 sends user notifications via various electronic communications, such as a text message, an email, an instant message, and/or the like. In another embodiment, the notification module 306 sends system messages to a system, such as Java Message Service ("JMS") messages, representational state transfer ("REST") calls, and/or the like.

In one embodiment, a monitor module 308 monitors data stored in a security compartment and sends an alert in response to data being modified. In certain embodiments, in response to the data being modified, the monitor module 308 alerts the signature module 202 that the data has been modified and that a new classification signature should be generated to determine whether the modified data conforms to the security classification of the security compartment associated with the data. In another embodiment, the notification module 306 sends a notification to a user or system in response to the monitor module 308 detecting changes in the data. The notification, in some embodiments, describes the data being modified, the security compartment where the data is located, the security classification for the data, the changes made to the data, and/or the like.

In another embodiment, the monitor module 308 monitors data in real-time as it is being modified and generates suggestions, recommendations, and/or the like associated with a security classification for the data. For example, the monitor module 308 may present security classification label suggestions to a user while the user is modifying the data. Alternatively, the monitor module 308 may recommend words, terms, or the like, that conform the data to a security classification while the user modifies the data.

The monitor module 308, in some embodiments, periodically monitors for security classification violations in the data. In certain embodiments, the monitor module 308 finds and reports security classification violations to a user or system. The monitor module 308, in order to find and verify a violation exists, is in communication with the log module 304 to mine and extract data from one or more generated logs. The monitor module 308 may also be in communication with the signature module 202 to get a current classification signature to determine whether the data's security classification complies with the security classification of data's storage location. In such an embodiment, the monitor module 308 accesses a classification signature cache, which may be maintained by the signature module 202, to retrieve current classification signatures for the data.

In one embodiment, the recommendation module 310 presents one or more classification recommendations to a user or system. As described above with reference to the monitor module 308, the recommendation module 310 may present one or more security classification suggestions to a user while the user is modifying sensitive data. For example, the recommendation module 310 may execute as part of a background process that monitors data modifications, such as a plugin or add-on for a word processing program, an email editor, and/or the like. For example, the recommendation module 310 may run in the background of an instance of Microsoft® Word® and provide suggestions while a user edits a document. In another embodiment, the recommendation module 310 may present classification recommendations to a user or a system based on data tracked in the log files generated by the log module 304. For example, the recommendation module 310 may monitor one or more log files that contain a semantic analysis history generated by the semantic engine 208, and, based on the log files, generate and present classification suggestions to a user or a system regarding improvements, modifications, or the like, that may make a security classification definition more accurate.

In another embodiment, the recommendation module 310 generates classification recommendations for data modifications that reduce an amount of overlap between two or more security classifications. In a further embodiment, the recommendation module 310 suggests new security classifications for the data based on the semantic analysis of the data. For example, the recommendation module 310 may suggest new security classifications in response to an overlap score being above a predetermined threshold in order to remove the overlap between two or more security classifications. In certain embodiments, the recommendation module 310 adjusts the predetermined threshold values in response to user input and/or in response to the overlap value. In another embodiment, the recommendation module 310 presents the different overlap combinations in order of overlap value. The recommendation module 310, in one embodiment, suggests user access recommendations, which may include modifications to a security access level associated with a user or system. In some embodiments, the recommendation module 310 suggests user or system access recommendations in response to an overlap score being above a predetermined threshold.

In another embodiment, in response to a user or system accepting, denying, modifying, or the like, classification recommendations presented by the recommendation module 310, the update module 302 may train or update the semantic analysis process based on the user's input. For example, the recommendation module 310 may recommend a particular word change for a term in a "Top Secret" document to make the word conform to the "Top Secret" security classification. If the user accepts the word change, the update module 302 may train the semantic engine 208 to recognize the recommended word as a "Top Secret" word in the future, in view of other contextual information associated with the word (e.g., such as classification guides, word lists, word associations, the context of the sentence or paragraph, document labels, or the like).

In some embodiments, the recommendation module 310 includes a classification guide engine that receives a plurality of classification signatures and generates one or more recommendations, reports, summaries, suggestions, or the like associated with a classification guide. For example, the classification guide engine may determine the most common terms associated with the classification signatures and use those terms as recommendations for a classification guide report, summary, or the like. In some embodiments, the classification guide engine determines a weighting system for words, terms, or the like that are common and/or most important based on the type of semantic engine 208 being used for semantic analysis.

In one embodiment, the management module 312 manages one or more classification signatures. In some embodiments, the management module 312 associates classification signatures with a classification authority ("CA") server 108. As used herein, a CA server 108 is a server 108 associated with a computing environment that maintains the storage and/or distribution of classification signatures. In some embodiments, the management module 312 maintains classification signatures in one or more signature files stored on the CA server 108. In certain embodiments, the CA server 108 includes a centralized server 108 accessible by devices within a computing environment. In one embodiment, the computing environment includes a CA server 108 for each security compartment. In some embodiments, the computing environment includes any number of CA servers as are necessary to maintain and manage classification signatures. While various functions may be performed on a CA server 108, such as encryption/decryption of data or classification signatures, data analysis, classification signature comparisons, and/or the like, the management module 312 may also perform these functions locally, i.e., within a security compartment.

In one embodiment, the management module 312 maintains classification signatures for each security compartment of the computing environment on the CA server 108. In certain embodiments, the management module 312 encrypts the classification signatures stored on the CA server 108. In some embodiments, the management module 312 encrypts classification signatures before signatures are sent to the CA server 108. In some embodiments, the management module 312 receives data from a security compartment to determine whether the data matches the security classification for the security compartment. The management module 312, in such an embodiment, accesses the signature file for the security compartment on the CA server 108. In one embodiment, on the CA server 108, the signature module 202 generates a classification signature for the data, the match module 204 compares the predetermined classification signature from the signature file to the generated classification signature, and the validation module 206 verifies the classification signatures match. In one embodiment, the management module 312 returns a match value generated by the validation module 206, such as a correlation, percentage, probability, or the like, to the security compartment associated with the data.

In another embodiment, the management module 312 distributes a signature file associated with a security compartment to the associated security compartment instead of storing classification signatures for a computing environment on a central CA server 108. In such an embodiment, each security compartment has its own CA server 108 and the management module 312 maintains a signature file for the classification signatures associated with the security compartment. In such an embodiment, a management module 312 associated with a central CA server 108 is responsible for distributing signature files to the appropriate security compartment.

In certain embodiments, a signature module 202 associated with a security compartment generates a classification signature for data associated with the security compartment, instead of sending the data to a central CA server 108 to be analyzed. The management module 312 associated with the security compartment sends the generated classification signature for the data to one or more different CA servers 108 to determine whether the classification signature of the data matches a predetermined classification signature of a different security compartment. In one embodiment, the management module 312 encrypts the generated classification signature before it is distributed to one or more different CA servers 108, where it is decrypted and compared. The management module 312 may also generate a hash, password, and/or the like to secure the classification signature before it is transmitted. In another embodiment, the management module 312 associated with the different security compartments returns a match value generated by the validation module 206, such as a correlation, percentage, probability, or the like, to the security compartment associated with the data.

In some embodiments, the management module 312 updates one or more signature files in response to one or more classification signatures for a security classification being updated. For example, if the meaning of the "Top Secret" security classification is modified, and a new baseline classification signature for the "Top Secret" security classification is generated, the management module 312 determines which, if any, of the signature files are associated with the new baseline classification signature, and updates the signature file accordingly.

In another embodiment, the management module 312 maintains a "family" of classification signatures, which is a collection of classification signatures associated with one or more security compartments and owned by a CA having a security classification that is the same as the security classification of the security compartments. In certain embodiments, the match module 204 adjusts how the classification signatures are compared in order to provide more meaningful results for the family of classification signatures. For example, if a CA is responsible for five different classification signatures associated with one or more security compartments that have similar characteristics, the match module 204 and/or the validation module 206 may determine strong match values for the classification signatures. In order to generate more meaningful comparisons, a user or system may adjust the characteristics of the signature module 202, the match module 204, and/or the validation module 206, which may include modifying how signatures are generated, adjusting threshold values, modifying the semantic analysis process, and/or the like.

In certain embodiments, each module 202-312 of the security module 104 is in communication with each other through the data network 106 in order share data, provide dynamic, real-time feedback, updates, or the like. In certain embodiments, the security module 104 may be located on a plurality of information handling devices 102 and/or servers 108 and shares data, feedback, updates, and/or the like with other security modules 104. In some embodiments, the modules 202-312 distribute the workload among other modules 202-312 within the system. For example, signature module 202 may generate a classification signature 202 for a different security module 104 than the security module 104 it is associated with. In general, modules 202-312 (or a user or system) may provide commands, such as "Signature," "Match," "Validate," "Update," "Log," and/or "Recommendation" to have a different module 202-312 perform the requested command. In certain embodiments, distributing the work among various security modules 104 is more efficient in situations that require generating security classifications in bulk (e.g., on a large amount of data, such as the first time data within a database is being classified). Similarly, the modules 202-312 may send notifications, messages, alerts, or the like, to each other regarding errors, updates, violations, or the like.

FIG. 4 depicts one embodiment of a computing environment 400. In one embodiment, the computing environment 400 includes information handling devices 102, security modules 104, data networks 106, and servers 108, which may be substantially similar to the information handling devices 102, security modules 104, data networks 106, and servers 108 of FIG. 1. The computing environment 400, in another embodiment, includes users 402a-b, security compartments 404a-c, signature databases 406a-d, and forward semantic elements ("FSE") 408a-c, which are described in more detail below.

In one embodiment, the security module 104 determines whether data being transmitted across the network 106 includes a security classification associated with the sender and recipient of the data. In one embodiment, the security classification is included in the file payload metadata of the data. In some embodiments, the user 402a includes a sender of data. In another embodiment, the user 402b includes a recipient of data. The users 402a-b, in certain embodiments, are assigned one or more security access classifications. For example, the data sender 402a may be assigned access to "Top Secret" data associated with security compartment A 404a and "Secret" data associated with security compartment B. Similarly, the data recipient 402b may be assigned access to "Top Secret" data associated with security compartment A 404a and "Secret" data associated with security compartment C.

In one embodiment, the data sender 402a assigns a security classification label/tag to data being sent to the data recipient 402b. In response to the data sender 402a sending the data to the data recipient 402b, the signature module 202 generates a classification signature for the data based on a semantic analysis of the data. For example, the signature module 202 generates a classification signature based on a semantic analysis of the contents of an email. In one embodiment, the signature module 202 generates a classification signature based on a semantic analysis of data sent via File Transfer Protocol ("FTP"), SSH File Transfer Protocol ("SFTP"), Java Message Service ("JMS"), Common Object Request Broker Architecture ("CORBA"), Hypertext Transfer Protocol PUT/POST/GET, or any other protocol for sending/receiving data. The match module 204, in another embodiment, compares the generated classification signature to the security classification label assigned to the data and a validation module 206 verifies the generated classification signature matches the security classification label to determine whether the user 402a labeled the data correctly.

In one embodiment, if the user 402a fails to label the data correctly, meaning the validation module 206 determined the classification signature and the classification label did not match, the validation module 206 returns the data to the data sender 402a. For example, the data sender 402a may have labeled the data as "Secret" for security compartment B; however, based on a semantic analysis of the data, the classification signature for the data may be "Top Secret" for security compartment B. In certain embodiments, the recommendation module 310 generates one or more suggestions to conform the data to the appropriate security level. In some embodiments, the recommendation module 310 highlights particular words, phrases, terms, or the like that may be indicative of different security classifications. In one embodiment where the semantic engine 208 has been thoroughly trained, the recommendation module 310 automatically changes the security classification label such that the security classification of the label conforms to the security classification of the data.

In some embodiments, the user 402a overrides the results of the semantic analysis. In such an embodiment, the update module 302 trains the semantic engine 208 to learn from the user's 402a input. Thus, even though the validation module 206 determined the classification signature and the label did not match, the user 402*a* may specify that the data is actually "Secret" data, and the semantic engine 208 would learn from the user's 402*a* input and apply the user's 402*a* input in future analyses.

In another embodiment, if the validation module 206 determines the user 402*a* labeled the data correctly, the match module 204 compares the classification signature of the data to the security classification accesses of the data recipient 402*b* and the validation module 206 determines whether the data recipient 402*b* has the requisite classification access to receive the data. If not, the data is returned to the data sender 402*a* and the notification module 306 sends a notification to the user 402*a* regarding the error in data transmission. In some embodiments, a log module 304 tracks data associated with the semantic analysis, which may include analyzed words, identifying information for the sender 402*a* and the recipient 402*b*, the initial classification label, recommendations generated by the recommendation module 310, and/or the like.

In another embodiment, the security module 104 determines whether data at rest, i.e., data stored on a server 108, conforms to the security classification for the security compartment 404*a-c* associated with the data. In one embodiment, a semantic engine 208 analyzes data stored on the servers 108*a-c* to ensure the security classification of the data matches the security classification of the security compartment 404*a-c* for the data, and/or one or more security levels within the security compartment 404*a-c*, in order to prevent data leakages and maintain the integrity of the data. In some embodiments, the semantic engine 208 is configured to analyze the data at regular, periodic, intervals or according to a predetermined, or user-generated, schedule. In one embodiment, the semantic engine 208 is configured to analyze the data in response to a system event, message, notification, or the like.

In one embodiment, the signature module 202 generates a classification signature for data located on a server 108*a-c*, for example server 108*a* associated with security compartment 404*a*. A match module 204 compares the generated classification signature to a predetermined classification signature that corresponds to the security classification of where the data is located. A validation module 206 verifies the generated classification signature matches the predetermined classification signature.

In some embodiments, the validation module 206 generates a match score that indicates the degree with which the classification signatures match. For example, a match score of 1.0 may indicate that the signatures are an exact match while a match score of 0.0 indicates that the signatures do not match at all. If the match score is within a predetermined threshold, the validation module 206 flags the data and notifies the user of the flagged data. In such an embodiment, the notification module 306 sends a notification to an administrator associated with the security compartment 404*a*. The notification may include the data, the security classification, the match score, recommendations, and/or the like.

Additionally, a log module 304, in some embodiments, tracks information related to the semantic analysis, such as the data being analyzed, recommendations generated by the recommendation module 310, the security classification, the match score, or the like. Moreover, the update module 304, in one embodiment, trains and modifies the semantic analysis process based on an analysis of the data, a user's response to the data (e.g., whether the user reclassified the data, modified the data, or the like), and the metadata tracked by the log module 304.

In another embodiment, the security module 104 performs real-time data analysis to determine whether data conforms to a particular security classification and to provide classification recommendations for the data. In one embodiment, the monitor module 308 monitors data modifications in real-time and notifies the signature module 202 that data has been modified. For example, a user 402*a* may be drafting an email to send to another user 402*b*. As the user 402*a* drafts the email, the monitor module 308 monitors the data being created by the user 402*a*. In one embodiment, the monitor module 308 executes as a background process for various programs, such as word processors, email clients, or the like.

The monitor module 308, in certain embodiments, uses a semantic engine 208 to analyze what the user is typing and automatically generates classification labels, suggestions, recommendations, or the like for the entire body of the email, sections of the body of the email, terms, sentences, phrases, or the like. In one embodiment, the monitor module 308 analyzes the user-generated data in response to the user input. For example, the monitor module 308 may allow a user 402*a* to force semantic analysis of the data by clicking a button within a word processing program. In some embodiments, a recommendation module 310 generates and presents one or more security classification suggestions. The user 402*a* may then accept, reject, or deny the presented recommendations. The update module 302, in one embodiment, receives the user input for the recommendations and trains the semantic engine 208 according to the user input.

In yet another embodiment, the security module 104 determines whether two or more security classifications overlap, which may indicate a potential data leak or point of weakness within a security compartment 404*a-c*. For example, security compartment B 404*b* may include "Top Secret" and "Secret" classified data. A user 402*a* with "Secret" security access clearance may potentially be able to access "Top Secret" data because the security classifications for "Secret" and "Top Secret" have been defined such that there is overlap between the two security classifications. In a similar embodiment, the security module 104 analyzes one or more security access classifications associated with a user 402*a-b* to determine an overlap value between two or more security access classifications for the user 402*a-b*.

In some embodiments, in order to minimize overlap, the signature module 202 generates classification signatures for two or more classification guides, which define the boundaries of a security classification, based on a semantic analysis of the classification guides. The match module 204 compares the generated classification signatures and the validation module 206 determines an overlap value for the comparison. In certain embodiments, an overlap score greater than 0.0 indicates that there may be some overlap between the security classifications. In such an embodiment, the notification module 306 sends a notification to a user, such as a classification officer, indicating the overlap value and the classification guides that were compared.

The recommendation module 310, in one embodiment, presents one or more recommendations, based on the semantic analysis of the classification guides, for redefining the boundaries of the security classifications and/or for creating new security classifications. In response to a classification guide being modified, the security module 104 re-analyzes data associated with the security classification, i.e., compares a classification signature of data on the server 108*b* to a new predetermined classification signature for the security compartment 404*b*, to determine whether the data is still compliant with the security classification.

In one embodiment, the signature databases 406*a-d* store one or more classification signatures for the computing environment 400. The signature databases 406*a-d* may include network attached storage devices, log files, relational database systems, and/or the like. In certain embodiments, the signature databases 406*a-d* may be located on the servers 108*a-d*, such as a relational database stored on a storage device of a server 108*a-d*.

In one embodiment, the management module 312 manages one or more classification signatures for the computing environment 400. The management module 312, in some embodiments, maintains a plurality of predetermined classification signatures in one or more signature files, which may be stored in a signature database 406*a-d*. For example, the management module 312 may maintain the predetermined classification signatures in a single signature file associated with a central CA server 108*d*. In another embodiment, the management module 312 maintains the predetermined classification signatures in multiple signature files, with each signature file being associated with a security compartment 404*a-c*.

In one embodiment where the management module 312 maintains a single signature file, the CA server 108*d* performs the functions of the security module 104 for the computing environment 400. For example, an FSE 408*a*, or the like, for security compartment 404*a* may send a document to the CA server 108*d* to be semantically analyzed against one or more predetermined classification signatures stored in the signature database 406*d*. In such an embodiment, the security module 104 for the CA server 108*d* analyzes the data and returns the result generated by the validation module 206 to the security module A 404*a*.

In another embodiment where the management module 312 maintains the predetermined classification signatures in multiple signature files, each security compartment 404*a-c* performs its own semantic analysis of the data because each security compartment 404*a-c* has its own signature file. In such an embodiment, the management module 312 distributes signature files from the CA server 108*d* to the security compartments 404*a-c*. In this embodiment, the data is not transferred over the network 106 to the CA server 108*d*, but is instead analyzed locally. Further, in some embodiments, the management module 312 does not use a CA server 108*d* to manage the classification signatures, but instead manages the classification signatures, or a file of classification signatures, locally, i.e., within a security compartment 404*a-c* associated with the classification signature or signature file. In such an embodiment, the management module 312 encrypts/decrypts classification signatures, analyzes data, compares classification signatures, or the like, within the security compartment 404*a-c* with or without using a CA server 108.

Figure 5:
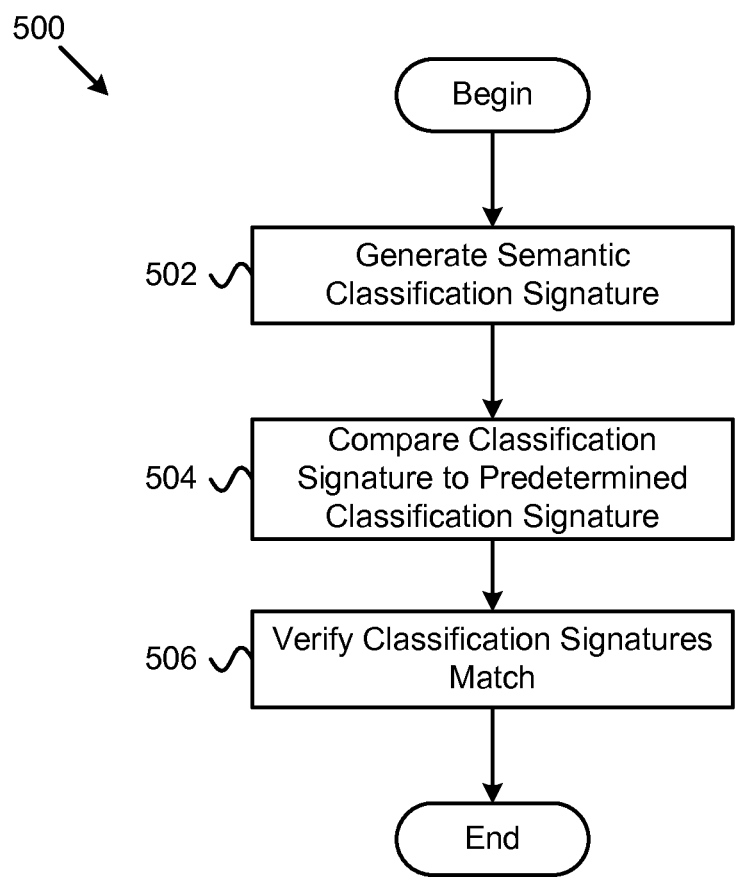
FIG. 5 is a schematic flow diagram illustrating one embodiment of a method for determining a security classification for data.

FIG. 5 depicts one embodiment of a method 500 for determining a security classification for data. In one embodiment, the method 500 begins and the signature module 202 generates 502 a classification signature for data based on a semantic interpretation of the data. In one embodiment, the classification signature is associated with a security classification for the data.

In another embodiment, the match module 204 compares 504 the generated classification signature to a predetermined classification signature associated with the security classification. In a further embodiment, the validation module 206 verifies 506 the generated classification signature matches the predetermined classification signature, and the method 500 ends.

Figure 6:
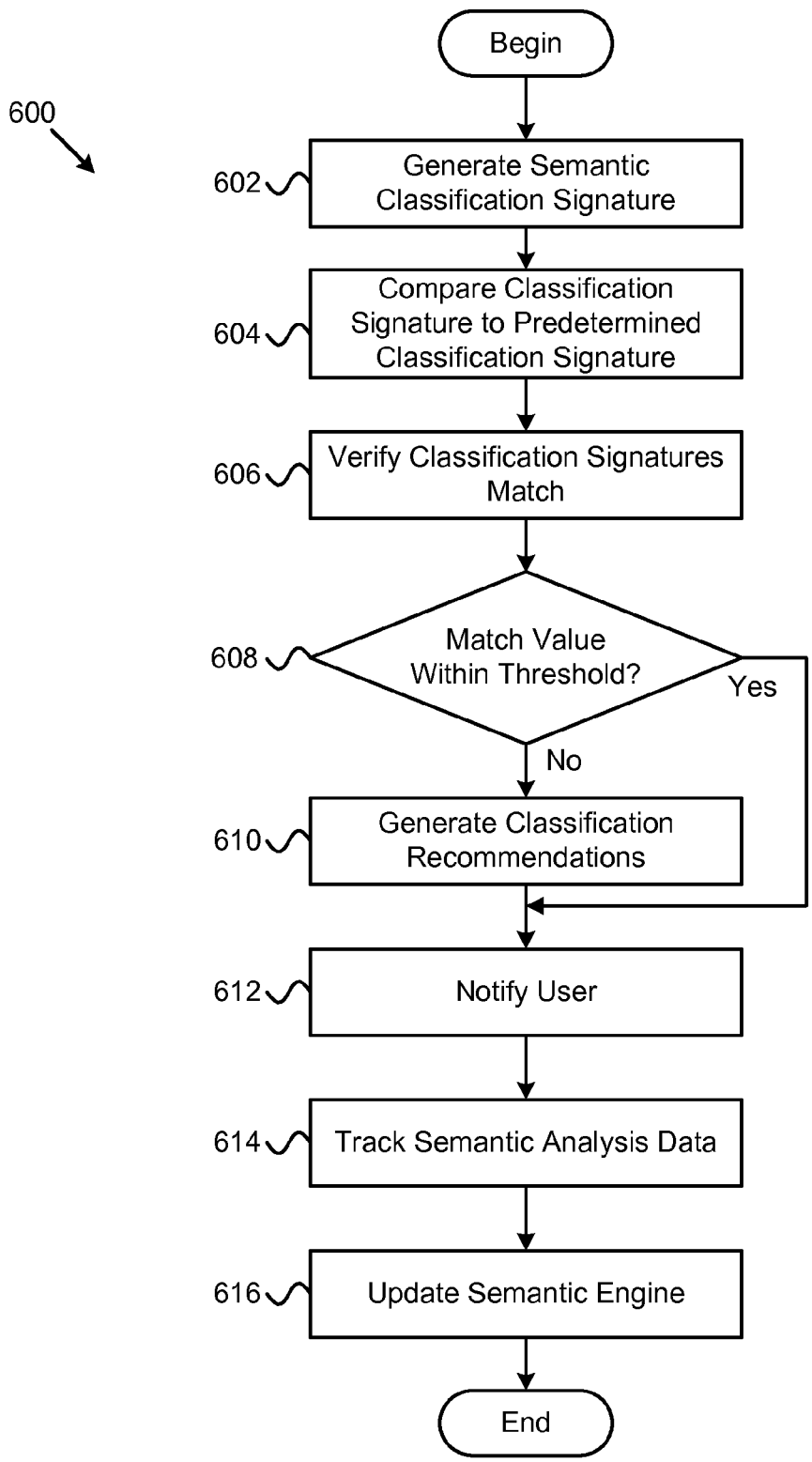
FIG. 6 is a schematic flow diagram illustrating one embodiment of another method for determining a security classification for data.

FIG. 6 depicts one embodiment of another method 600 for determining a security classification for data. In one embodiment, the method 600 begins and the signature module 202 generates 602 a classification signature for data based on a semantic interpretation of the data. The match module 204, in another embodiment, compares 604 the generated classification signature to a predetermined classification signature associated with the security classification. In a further embodiment, the validation module 206 verifies 606 the generated classification signature matches the predetermined classification signature.

In one embodiment, the match module 204 generates a match value and the validation module 206 determines 608 whether the match value is within a predetermined match threshold. If the validation module 206 determines 608 that the match value is not within a predetermined threshold, the recommendation module 310 generates 610 and presents classification suggestions to a user regarding improvements, modifications, or the like, that may make a security classification definition more secure.

Regardless of whether the validation module 206 determines 608 that the match value is or is not within a predetermined threshold, the notification module 306 notifies 612 the user of the results of the classification signature comparison. In certain embodiments, the notification comprises an identifier for the data, the classification signatures, the security classifications, results of the semantic analysis, and/or the like.

Similarly, in another embodiment, the log module 304 tracks 614 information related to the semantic analysis, including the data being analyzed, recommendations generated by the recommendation module 310, the security classification, the match score, and/or the like. An update module 302, in certain embodiments, updates 616 the semantic analysis engine using information from the performed semantic analysis, such as words, phrases, patterns, and/or the like. In some embodiments, the update module 302 updates 616 the semantic engine 208 using information stored in a log file, data stored in a security compartment, user input, and/or the like. And the method 600 ends.

Figure 7:
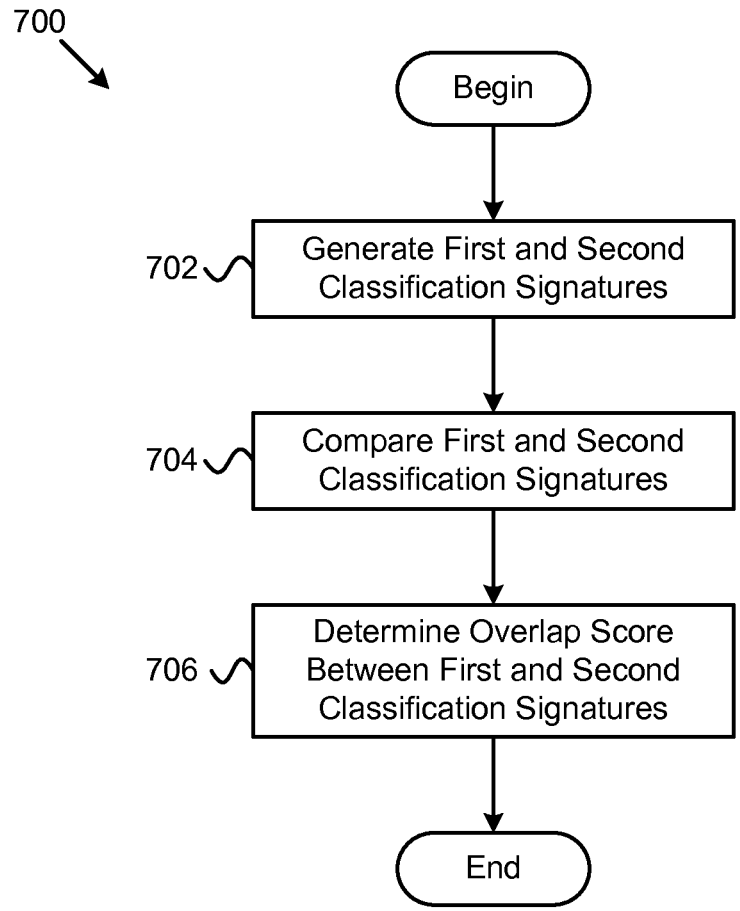
FIG. 7 is a schematic flow diagram illustrating one embodiment of a method for determining overlapping security classifications.

FIG. 7 depicts one embodiment of a method 700 for determining overlapping security classifications. In one embodiment, the method 700 begins and the signature module 202 generates 702 first and second classification signatures based on a semantic analysis of a first data and a second data, respectively. In certain embodiments, the first classification signature is associated with a first security classification and the second classification signature is associated with a second security classification.

In one embodiment, a match module 204 compares 704 the first classification signature with the second classification signature. In a further embodiment, the validation module 206 determines 706 an overlap score between the first classification signature and the second classification signature. In some embodiments, the overlap score determines the degree with which the first security classification overlaps with the second security classification. And the method 700 ends.

As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program code may, for instance, comprise one or more physical or logical blocks of computer instructions which may, for instance, be organized as an object, procedure, or function. Nevertheless, the executables, and/or non-executables, of an identified module need not be physically located together, but may comprise disparate instructions stored in different locations which, when joined logically together, comprise the module and achieve the stated purpose for the module.

Indeed, a module of program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the program code may be stored and/or propagated on in one or more computer readable medium(s).

The computer readable medium may be a tangible computer readable storage medium storing the program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable storage medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store program code for use by and/or in connection with an instruction execution system, apparatus, or device.

The computer readable medium may also be a computer readable signal medium. A computer readable signal medium may include a propagated data signal with program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport program code for use by or in connection with an instruction execution system, apparatus, or device. Program code embodied on a computer readable signal medium may be transmitted using any appropriate medium, including but not limited to wire-line, optical fiber, Radio Frequency (RF), or the like, or any suitable combination of the foregoing In one embodiment, the computer readable medium may comprise a combination of one or more computer readable storage mediums and one or more computer readable signal mediums. For example, program code may be both propagated as an electro-magnetic signal through a fiber optic cable for execution by a processor and stored on RAM storage device for execution by the processor.

Program code for carrying out operations for aspects of the present disclosure may be written in any combination of one or more programming languages, including, but not limited to, an object oriented programming language such as Java, Smalltalk, C++, PHP or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

In one implementation, the computer program product may be shared, simultaneously serving multiple customers in a flexible, automated fashion. The computer program product may be standardized, requiring little customization and scalable, providing capacity on demand in a pay-as-you-go model.

The computer program product may be stored on a shared file system accessible from one or more servers. The computer program product may be executed via transactions that contain data and server processing requests that use Central Processor Unit (CPU) units on the accessed server. CPU units may be units of time such as minutes, seconds, hours on the central processor of the server. Additionally the accessed server may make requests of other servers that require CPU units. CPU units are an example that represents but one measurement of use. Other measurements of use include but are not limited to network bandwidth, memory usage, storage usage, packet transfers, complete transactions etc.

Aspects of the embodiments may be described above with reference to schematic flowchart diagrams and/or schematic block diagrams of methods, apparatuses, systems, and computer program products according to embodiments of the invention. It will be understood that each block of the schematic flowchart diagrams and/or schematic block diagrams, and combinations of blocks in the schematic flowchart diagrams and/or schematic block diagrams, can be implemented by program code. The program code may be provided to a processor of a general purpose computer, special purpose computer, sequencer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

The program code may also be loaded onto a computer, other programmable data processing apparatus, or other devices to cause a series of operational steps to be performed on the computer, other programmable apparatus or other devices to produce a computer implemented process such that the program code which executed on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

The present subject matter may be embodied in other specific forms without departing from its spirit or essential characteristics. The described embodiments are to be considered in all respects only as illustrative and not restrictive. All changes which come within the meaning and range of equivalency of the claims are to be embraced within their scope.

What is claimed is:

1. A method for determining a security classification for data, the method comprising:
   generating a classification signature for data based on a semantic interpretation of the data, the classification signature associated with a security classification for the data, the data stored in a level of a security compartment corresponding to the security classification for the data, the security compartment comprising one or more levels, wherein each level corresponds to a particular security classification;
   comparing the generated classification signature to a predetermined classification signature associated with the security classification for the level of the security compartment where the data is stored;
   verifying the generated classification signature matches the predetermined classification signature; and
   monitoring data modifications and generating a classification signature for the data in real-time in response to the data modifications;
   wherein one or more classification recommendations for the data are presented to a user in response to the generated classification signature for the data in real-time not matching the predetermined classification signature, a classification recommendation comprising a data modification to conform the data to the security classification of the predetermined classification signature.

2. The method of claim 1, wherein the semantic interpretation of the data is performed using a semantic engine, the semantic engine determining the interpretation of the data based on one or more of a classification guide, a classification signature of existing data, a word list, and user input.

3. The method of claim 2, further comprising updating the semantic engine based on user input associated with the data.

4. The method of claim 1, further comprising determining a match value in response to comparing the generated and predetermined classification signatures, wherein verifying the generated classification signature matches the predetermined classification signature comprises determining the match value is within a predetermined threshold.

5. The method of claim 1, wherein the data is associated with a security compartment comprising one or more security levels, the security classification defining an access level for the security compartment.

6. The method of claim 1, further comprising comparing the generated classification signature to a security classification assigned to the data by a user, wherein the user is notified in response to the generated classification signature not matching the assigned security classification.

7. The method of claim 1, wherein the predetermined classification signature is associated with a security classification for a recipient of the data, the data being sent to the recipient in response to the generated classification signature matching the predetermined classification signature.

8. The method of claim 7, further comprising returning the data to a sender of the data in response to the generated classification signature for the data not matching the predetermined classification signature of the recipient, the data returned to the sender comprising suggestions for conforming the data to the security classification of the recipient.

9. The method of claim 1, wherein the predetermined classification signature is one of a plurality of predetermined classification signatures associated with a data repository, the predetermined classification signature being associated with one of a plurality of security compartments of the data repository.

10. The method of claim 9, wherein the data comprises data within a security compartment of the data repository, the generated classification signature for the data being compared to the predetermined classification signature for the security compartment to verify the security classification of the data corresponds to a security classification of the security compartment.

11. The method of claim 1, further comprising sending a notification in response to the generated classification signature not matching the predetermined classification signature.

12. The method of claim 1, further comprising managing one or more predetermined classification signatures, the one or more predetermined classification signatures being organized into a signature file, the signature file being stored on a classification device of a computing environment.

13. An apparatus for determining overlapping security classifications, the apparatus comprising:
a processor;
a memory that stores machine readable code executable by the processor, the machine readable code comprising:
a signature module that generates a first classification signature for a first data based on a semantic interpretation of the first data and a second classification signature for a second data based on a semantic interpretation of the second data, the first classification signature being associated with a first security classification and the second classification signature being associated with a second security classification, the first data stored in a level of a security compartment corresponding to a security classification for the first data, the security compartment comprising one or more levels, wherein each level corresponds to a particular security classification;
a match module that compares the first classification signature with the second classification signature, the second classification signature associated with the level of the security compartment where the first data is stored;
a validation module that determines an overlap score between the first classification signature and the second classification signature, the overlap score determining the degree with which the first security classification overlaps with the second security classification; and
a monitor module that monitors data modifications;
wherein the signature module generates the first classification signature for the first data in real-time in response to the data modifications, wherein one or more classification recommendations for the first data are presented to a user based on an overlap score between the generated classification signature and the second classification signature, a classification recommendation comprising a data modification to the first data that modifies the overlap score.

14. The apparatus of claim 13, wherein the match module further compares a third classification signature for a third data with both the first and second classification signatures, and the validation module further determines an overlap score between the first, second, and third classification signatures.

15. The apparatus of claim 13, further comprising a recommendation module that generates one or more classification recommendations for the data, the classification recommendations comprising data modifications that reduce an amount of overlap between the first security classification and the second security classification.

16. The apparatus of claim 15, wherein the recommendation module further generates one or more new security classifications for the data in response to the overlap score.

17. The apparatus of claim 15, wherein the recommendation module further generates one or more user access recommendations in response to the overlap score, a user access recommendation comprising a modification to a security access level associated with a user.

18. The apparatus of claim 13, wherein the validation module ranks sets of compared classification signatures in order of overlap score and presents the rankings to a user.

19. The apparatus of claim 13, wherein the first and second data comprise one or more of a plurality of classification guides and data associated with a security compartment.

20. The apparatus of claim 13, further comprising a notification module that sends a notification in response to the overlap score being above a predetermined threshold.

21. A program product for determining a security classification for data, the program product comprising a non-transitory computer readable storage medium that stores code executable by a processor to perform the actions of:
generating a classification signature for data based on a semantic interpretation of the data, the classification signature associated with a security classification for the data, the data stored in a level of a security compartment corresponding to the security classification for the data, the security compartment comprising one or more levels, wherein each level corresponds to a particular security classification;
comparing the generated classification signature to a predetermined classification signature associated with the security classification for the level of the security compartment where the data is stored;
verifying the generated classification signature matches the predetermined classification signature; and
monitoring data modifications and generating a classification signature for the data in real-time in response to the data modifications, wherein one or more classification recommendations for the data are presented to a user in response to the generated classification signature not matching the predetermined classification signature, a classification recommendation comprising a data modification to conform the data to the security classification for the predetermined classification signature.

22. The program product of claim 21, wherein the semantic interpretation of the data is generated using a semantic engine, the semantic engine determining the interpretation of the data based on one or more of a classification guide, a classification signature of different data, a word list, and user input.

23. The program product of claim 22, wherein the actions further comprise maintaining a log file comprising metadata associated with the generation of the semantic interpretation of the data.

* * * * *